Jan. 13, 1948.  B. W. MERZ ET AL  2,434,330
HIGH-FREQUENCY DIELECTRIC SEAMING APPARATUS
Filed June 6, 1944  4 Sheets—Sheet 1

INVENTORS
BENJAMIN W. MERZ
ALBERT M. SCHWEDA
BY
ATTORNEY

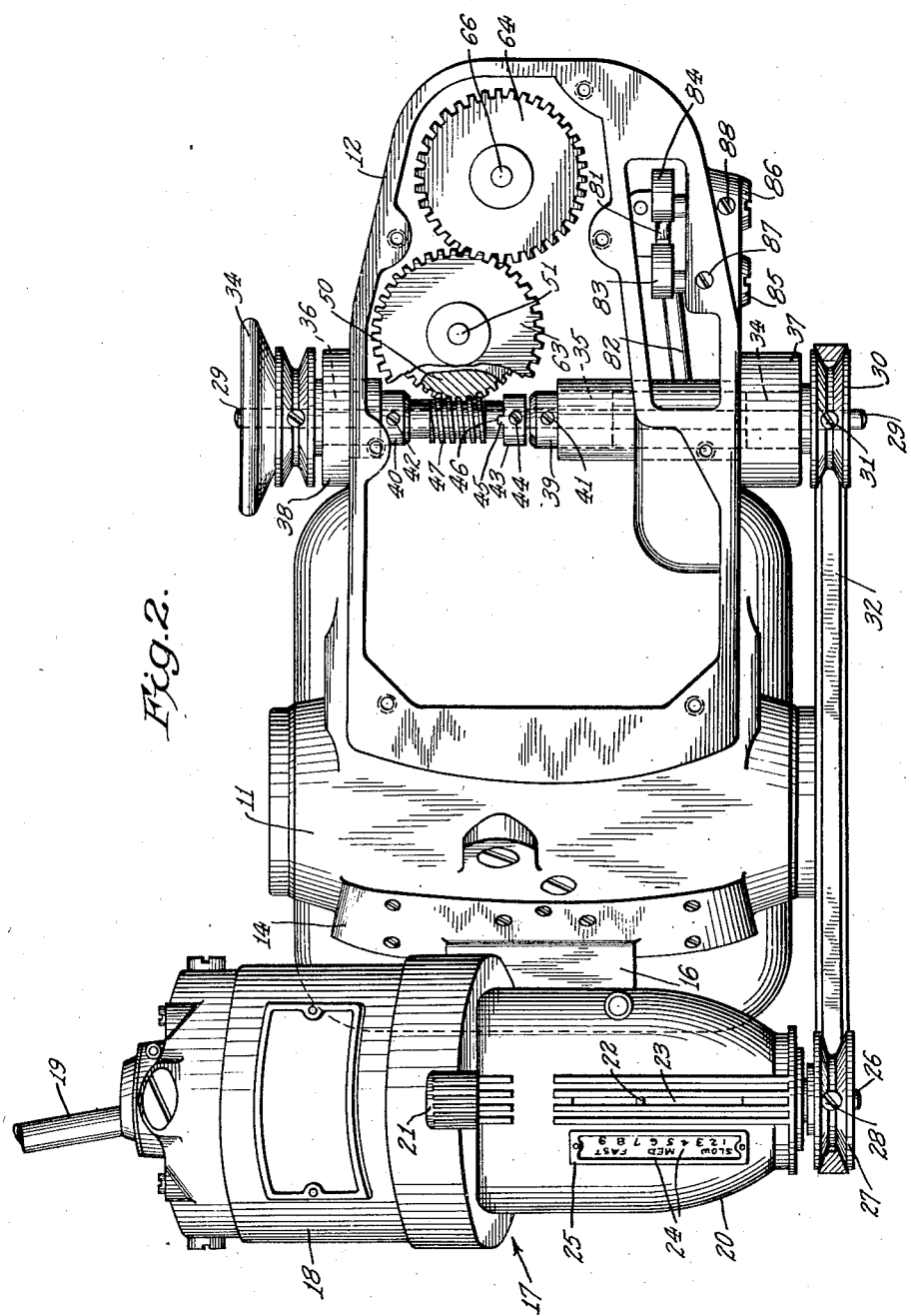

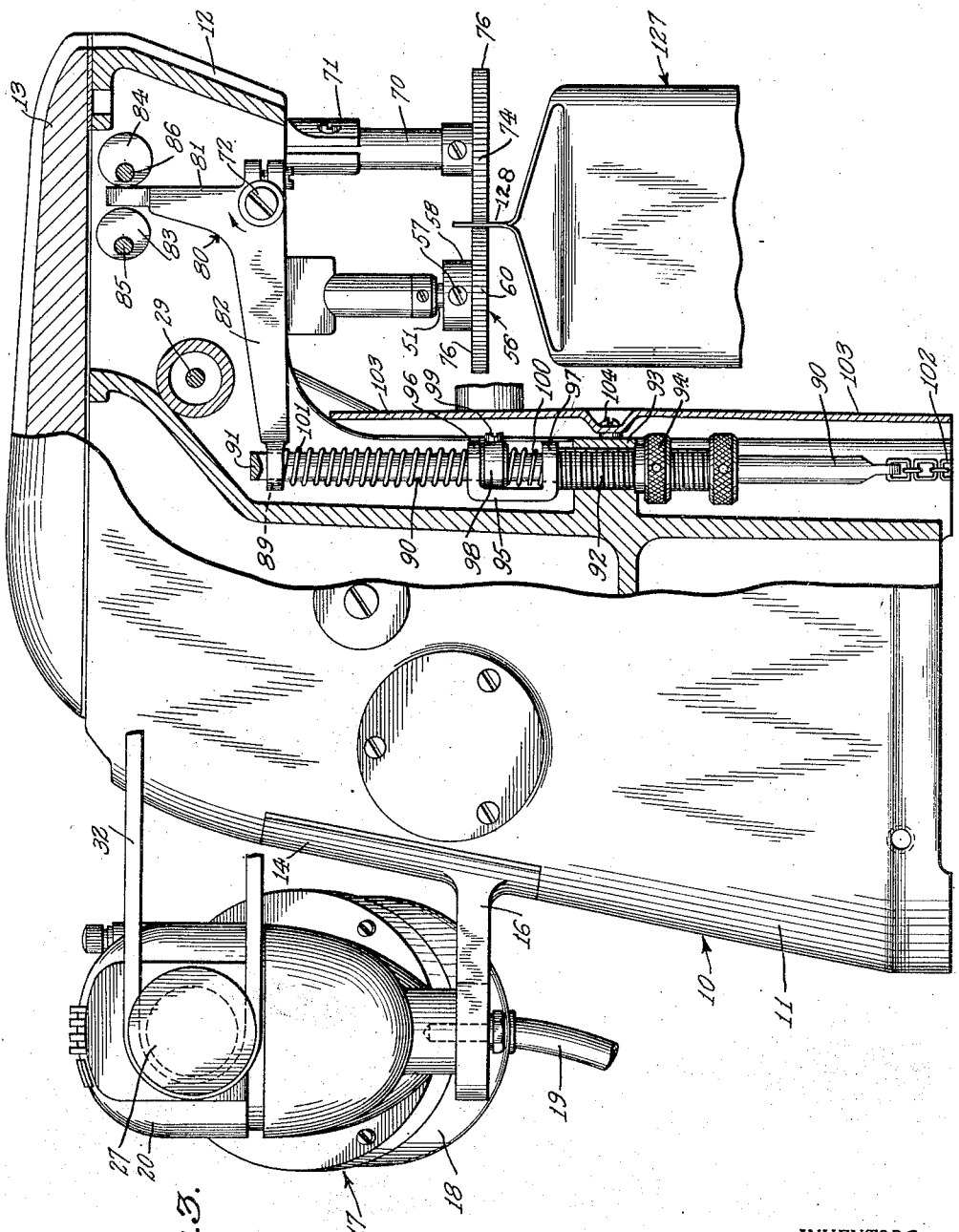

INVENTORS
BENJAMIN W. MERZ
ALBERT M. SCHWEDA
BY
ATTORNEY

Patented Jan. 13, 1948

2,434,330

UNITED STATES PATENT OFFICE 2,430,330

HIGH-FREQUENCY DIELECTRIC SEAMING APPARATUS

Benjamin W. Merz, Narberth, Pa., and Albert M. Schweda, Chicago, Ill., assignors to Union Special Machine Company, Chicago, Ill., a corporation of Illinois Application June 6, 1944, Serial No. 539,018

4 Claims. (Cl. 219—47)

This invention relates to apparatus for electrically seaming or bonding together two or more materials, at least one of which becomes plastic upon being subjected to heat and pressure. This invention may properly be considered as being in the nature of an electronic sewing machine since it utilizes a high frequency current to obtain an adequate seal between two or more layers of the materials that are to be bonded.

It is the primary object of this invention to provide a simple and reliable apparatus which may be easily controlled and operated for electrically forming an effective and efficient bond or seam between two or more layers of material, at least one of which is thermoplastic in character.

Another object of this invention is to provide apparatus of the character indicated having certain parts so arranged as to facilitate the feeding and bonding together of the materials under consideration.

Another object of this invention is to provide electrical seaming apparatus that is especially suitable for use in sealing bags, packaged articles and the like.

This invention has for a further object the provision of apparatus of the type referred to above which is relatively inexpensive to manufacture, sturdy in construction, and substantially free of objectionable vibrations when in operation. By virtue of the design and arrangement of individual elements embodied in this invention, repair and maintenance costs are minimized.

The present invention contemplates the supplying of a suitable high frequency current to a pair of wheels or rollers forming electrodes that rotate on substantially parallel vertical axes and that have their peripheral surfaces closely adjacent. The wheels are suitably separated to prevent direct contact therebetween when not in use. The mechanism for driving the wheels is positioned to one side and above the wheels, thereby leaving a clear space below the wheels. As will be noted from further consideration of this invention, the apparatus is so arranged that various articles, including bags and the like, may be readily sealed with a minimum of effort.

The above mentioned, as well as other objects, together with the many advantages attainable by the practice of the present invention, will be readily comprehended by persons skilled in the art from the following detailed description taken in conjunction with the annexed drawings, which respectively describe and illustrate a preferred embodiment of the invention, and wherein Figure 1 is a side elevation view, partly in cross-section, of a machine embodying the invention with certain parts removed;

Figure 2 is a top plan view of the machine with the top cover plate removed and illustrating various parts broken away;

Figure 3 is a side elevation view taken 180° to Figure 1. Certain parts omitted in Figure 1 are illustrated in Figure 3, while certain other parts illustrated in Figure 2 are omitted in Figure 3;

Figure 1:
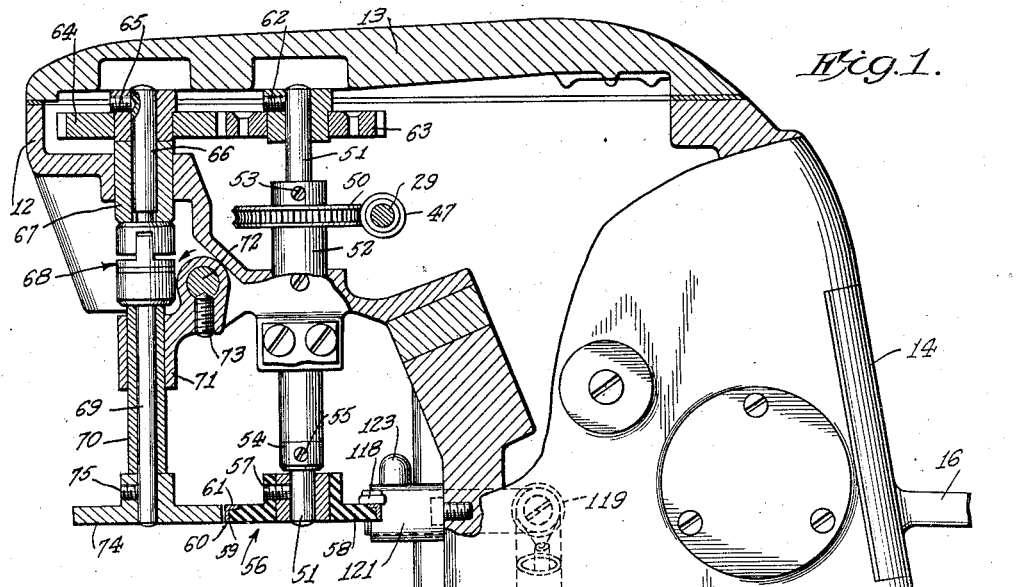

Referring now to the drawings wherein similar reference characters are employed to indicate corresponding parts throughout the several views, numeral 10 generally denotes a housing, formed preferably as a metallic casting and consisting of an upstanding hollow base 11 and an overhanging hollow bracket arm 12. A readily removable top cover plate 13 is provided on bracket arm 12 while a rear cover plate 14 is carried by base 11. Housing 10 is adapted to be mounted on a table or other suitable support 15.

A bracket 16, integral with rear cover plate 14, supports a variable speed driving unit 17, consisting of a suitable electric motor 18 connected to a conductor cable 19 for supplying electrical energy from a source (not shown) and a conventional speed controller 20 in the transmission from the motor. Speed controller 20 is manually adjusted by a rotatable knob 21 which operates an indicator pointer 22 that rides in a slot 23. Graduations or like indicia 24 on a plate 25 that is parallel to slot 23 are visual aids to the adjustment of the speed of unit 17. The driving unit includes a drive shaft 26 which has a suitable pulley 27 affixed thereto by means of a set screw 28.

A driven shaft 29 extends through and beyond hollow bracket arm 12 and has a driven pulley 30 secured proximate one end thereof by means of a set screw 31. An open V-belt 32 transmits rotational energy from drive pulley 27 to driven pulley 30. A combined hand-wheel and pulley 34 is fastened to the other free end of shaft 29 as depicted in Figure 2. Shaft 29 is journaled in bearings 34', 35 and 36, bearings 34 and 36 being positioned within bearing housings 37 and 38, respectively. A pair of collars 39 and 40 are secured to shaft 29 by set screws 41 and 42, respectively, and are disposed immediately adjacent bearings 35 and 36, respectively, to prevent axial movement of shaft 29. A third collar 43 which is attached to shaft 29 by means of a corresponding screw 44 is provided with a key portion 45 that registers with a slot 46 in a worm gear 47 which meshes with and actuates a worm wheel 50.

As will be observed from an examination of Figure 1, worm wheel 50 is suitably secured to a vertical shaft 51 which is journaled in a bushing 52 that is disposed in overhanging bracket arm 12 and which is maintained in position by a set screw 53. A collar 54 is maintained on shaft 51 by a set screw 55. Numeral 56 generally indicates a wheel or roller which serves as one of the rotary electrodes employed in this invention and which is affixed to the lower end of shaft 51 by a set screw 57. Wheel 56 comprises a hub and main body portion 58 that is made of a suitable electrical insulating material and a metallic rim 59 having good electrical conductive properties. Rim 59 consists of an annular ring 60 that constitutes the periphery of wheel 56 and an inwardly extending radial flange 61 disposed above ring 60 and integral therewith.

Mounted at the upper end of shaft 51 by means of a set screw 62 is a gear wheel 63 preferably composed of a non-conducting laminated plastic material which meshes with a second gear wheel 64, of like size and of the same or similar composition, which is connected by a set screw 65 to the upper end of a stub shaft 66. Stub shaft 66 is rotatable in a sleeve or bushing 67 and is connected at it slower end to the upper portion of a universal or floating coupling 68, which in turn is connected to the upper end of a shaft 69. Shaft 69 is rotatable in a bushing sleeve 70 that is carried by a bracket 71 which is attached to a horizontal shaft 72 by a set screw 73. A second wheel or roller 74 which serves as the other rotary electrode of our invention is fastened to the lower end of shaft 69 by a set screw 75. Wheel 74 should have good electrical conductive properties and should preferably be of the same size and configuration as wheel 56 described above. The peripheral surface of each of the wheels or rotary electrodes 56 and 74 may be smooth or may be serrated or otherwise roughened as indicated at 76 in order to provide adequate traction in feeding the work to be seamed in the manner to be explained.

Disposed within overhanging bracket arm 12 and clamped to shaft 72 is an L-shaped lever 80 consisting of a vertical arm 81 and a horizontal arm 82. (See Figs. 2 and 3.) The free end of arm 81 is positioned between a pair of eccentric stops 83 and 84 which are affixed to the inner end portions of a pair of slotted studs 85 and 86, respectively. The distance between the peripheries of the eccentric stops along a line through the axes of studs 85 and 86 and the precise location of this gap may be readily varied by turning either or both of the studs a desired predetermined extent to thereby adjust the throw of the upper end of vertical arm 81. Studs 85 and 86 are retained in desired position by means of set screws 87 and 88, respectively. A vertical opening 89, extending through the free end of horizontal arm 82, receives a pull rod 90 that is freely slidable therethrough. The upper end of pull rod 90 carries a head 91 of suitable size and configuration to bear upon horizontal arm 82 upon predetermined downward movement of rod 90. Rod 90 is slidable through a micrometer adjusting sleeve 92 which is in threaded engagement with a projection 93 forming a part of base 11. Adjusting sleeve 92 carries an internally threaded lock-nut 94 which bears against the under surface of projection 93. A U-shaped stop 95 is mounted on the upper end of sleeve 92 and is formed with a pair of horizontal legs 96 and 97 through which pull rod 90 is adapted to pass. (See Figs. 3 and 4.) Intermediate the legs of stop 95 are a collar 98, which is secured to pull rod 90 by a set screw 99, and a compression spring 100 which bears against the upper surface of leg 97 and the under surface of collar 98. Stop 95, collar 98 and compression spring 100 cooperate to normally urge pull rod 90 upwardly and maintain head 91 out of engagement with horizontal arm 82 as shown in Figure 3. A second compression spring 101 concentric with pull rod 90 bears against the upper surface of leg 96 of U-stop 95 and the under surface of the free end of arm 82 to normally tilt L-lever 80 in a clockwise direction (Fig. 3) and cause the free end of arm 81 to bear against stop 84. It will be observed that at this time shaft 72, which is coupled to L-lever 80, tends to rotate in a clockwise direction as indicated by the arrow in Figure 3. As viewed in Figure 1 this arrangement normally tends to rotate shaft 72 in a counter-clockwise direction as indicated by the arrow thereby actuating bracket 71 and urging the peripheral surface of rotary electrode 74 to its nearest position with respect to the peripheral surface of rotary electrode 56. These peripheral surfaces are preferably never permitted to come in contact with each other but are spaced a suitable minimum distance as controlled by vertical arm 81 of L-lever 80 and eccentric stop 84. A chain or similar linkage 102 connects the lower end of pull rod 90 to a foot pedal or the like for imparting a downward pull to rod 90. Access to micrometer adjusting sleeve 92 and to the other items of equipment associated with pull rod 90 is had by removing a cover plate 103 which is attached to projection 93 by a stud-bolt 104.

Figure 4:
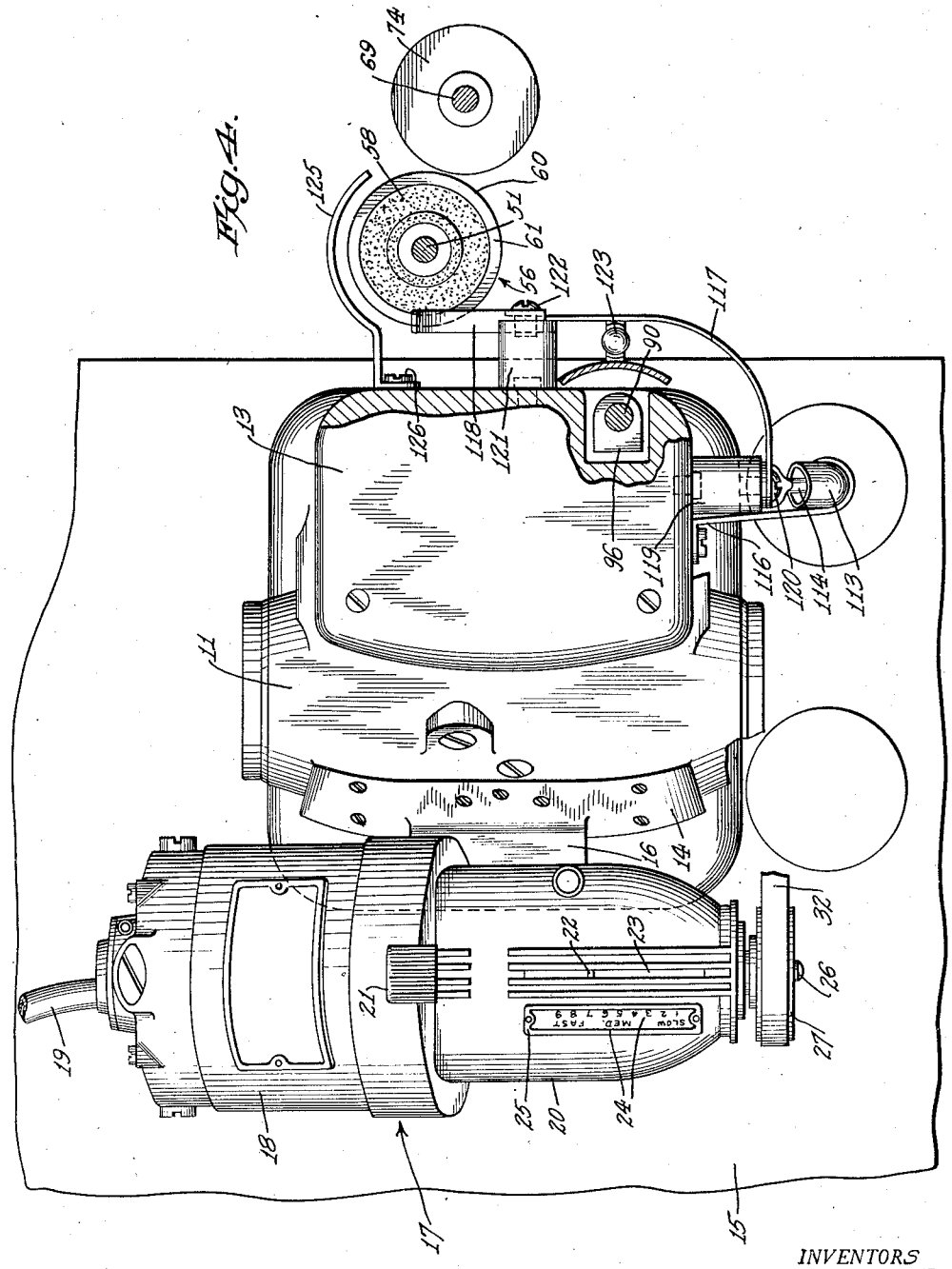
Figure 4 is a top plan view similar to Figure 2 with certain parts removed.

Turning next to Figures 1 and 4, we have illustrated therein means for supplying a suitable high frequency current to rotary electrodes 56 and 74. This includes a high frequency oscillation generator 110 of any suitable construction that is disposed below table 15 and is secured to the under surface thereof by means of a pair of brackets 111 and 112. Concentric lines, consisting of an outer tubular conductor 113 and an inner conductor 114 that enter oscillation generator 110 at 115, conduct the high frequency current to wheels 56 and 74 in a manner now to be explained. Tubular conductor 113 is connected to housing 10 by means of an electrically conductive bracket 116 and is, therefore, in electrical communication with outer wheel 74. Inner conductor 114 is in series electrical communication with a bar conductor 117, a spring strip conductor 118 and flange 61 of wheel 56 in the order set forth, inner conductor 114 and bar conductor 117 being connected to an insulator 119 by means of a screw or terminal post 120, and bar conductor 117 and spring strip conductor 118 being connected to a similar insulator 121 by a screw or terminal post 122. Insulators 119 and 121 are secured in any convenient way to the base member 11. A small neon lamp 123 is connected to bar conductor 117 for the purpose of visually indicating the presence of the high frequency current in the circuit. A curved guard 125 that is attached to the housing by a stud-bolt 126 is arranged in spaced relation to wheel 56 and serves to protect the operator's hand from coming in contact with said wheel.

The conducting means for transmitting the high frequency current from the oscillation generator to the rotary electrodes should preferably be approximately equal in length to one-quarter of the wave length, at the operating frequency of oscillation generator 110, in order that maximum voltage may be applied to wheels 56 and 74. The frequency of the current supplied by oscillation generator 110 and the electrical power input to wheels 56 and 74 are factors which may be readily determined by persons skilled in the art and will depend to some extent upon the character of the materials to be bonded together and the nature of the seal to be obtained.

Figure 5:
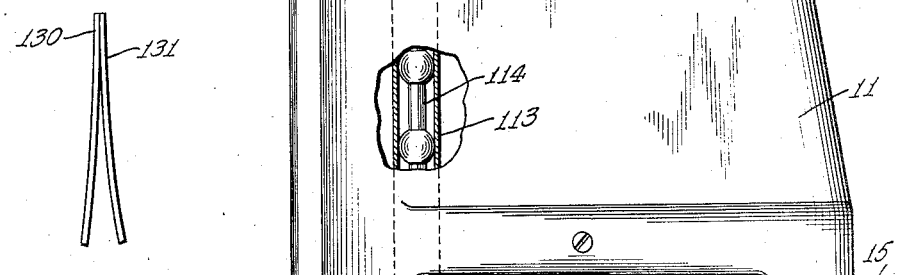
Figures 5 and 6 illustrate materials to be bonded together by the apparatus of this invention.

We have generally indicated a filled bag 127 in Figure 3, the upper end of which bag is being sealed by the apparatus of this invention. As was stated earlier, at least one of the parts involved in the sealing procedure must be thermoplastic in composition. The upper part 128 of bag 127 may consist of two (2) dielectric materials 130 and 131, either or both of which may be thermoplastic; or, if desired, a strip of thermoplastic material may be placed between other types of material of suitable character, if the thermoplastic becomes adhesive to the other materials upon heating to a desired temperature. The materials to be united are placed against each other, as shown in Figure 5, and are continuously fed between and beyond wheels 56 and 74, being subjected to the yielding pressure applied to inner wheel 56 by the outer wheel 74 and being subjected to the high frequency field created by the current supplied by oscillation generator 110. As the materials to be bonded pass between and beyond wheels 56 and 74, they are subjected to heat generated by the electric field, which heat causes the thermoplastic material to become sticky or tacky and hence the juxtaposed layers to be sealed together. It will be understood that the wheel 74 and rim 59 of the wheel 56 are good conductors of heat and therefore serve to prevent overheating of the surfaces of the work directly engaged by the wheels.

Figure 6:
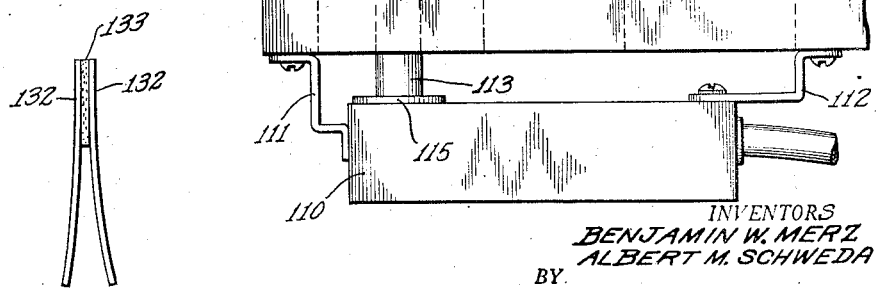

In Figure 6 there are illustrated two (2) dielectric materials 132 having a suitable thermoplastic material 133 interposed therebetween. These materials are bonded together in a manner similar to that outlined in connection with materials 130 and 131 above, the thermoplastic serving as an adhesive for uniting the other materials.

From the foregoing it is believed that the construction, operation and advantages obtainable by the practice of our instant invention will be readily understood by persons skilled in the art. It is to be borne in mind, however, that various changes in the apparatus, herewith illustrated and described, may be resorted to without departing from the spirit of the invention or the scope of the subjoined claims.

We claim:

1. In apparatus of the character described, the combination comprising a housing including a generally upstanding base and a bracket arm extending laterally of the base, a first shaft and a second shaft carried by the bracket arm and projecting therebelow, said shafts being substantially vertical and parallel, said first shaft including a universal coupling intermediate its ends, a wheel secured to the lower part of each shaft, at least the peripheral portion of each wheel being electrically conductive, means for maintaining the wheels in predetermined minimum spaced relation comprising a bracket connected to the first shaft intermediate its wheel and the universal coupling and pivotally connected to the housing, and means including the wheels for creating a high frequency electric field between said peripheral portions of the wheels.

2. In apparatus of the character described, the combination comprising a housing including a generally upstanding base and a bracket arm extending laterally of the base, a first shaft and a second shaft carried by the bracket arm and projecting therebelow, said shafts being substantially vertical and parallel, said first shaft including a universal coupling intermediate its ends, a wheel secured to the lower part of each shaft, at least the peripheral portion of each wheel being electrically conductive, means for maintaining the wheels in predetermined minimum spaced relation comprising a bracket connected to the first shaft intermediate its wheel and the universal coupling and pivotally connected to the housing, means including the wheels for creating a high frequency electric field between said peripheral portions of the wheels, and driving means electrically insulated from the last-mentioned means for rotating both of the wheels positively and simultaneously about their respective axes, said driving means comprising a rotary driving unit carried by the base remote from the bracket arm, a worm gear within the bracket arm and rotatable in timed relation to the driving unit, and gearing connected to each of the shafts and operatively engaging the worm gear.

3. In apparatus of the character described, the combination comprising a housing including a generally upstanding base and a bracket arm extending laterally of the base, a first shaft and a second shaft carried by the bracket arm and projecting therebelow, said shafts being substantially vertical and parallel, said first shaft including a universal coupling intermediate its ends, a wheel secured to the lower part of each shaft, at least the peripheral portion of each wheel being electrically conductive, means for maintaining the wheels in predetermined minimum spaced relation comprising a stub shaft carried by the housing, a bracket connected to the first shaft intermediate its wheel and the universal coupling and pivotal about the axis of the stub shaft, and a lever connected to the bracket and pivotal about the axis of the stub shaft, and means including the wheels for creating a high frequency electric field between the peripheral portions of the wheels.

4. In apparatus of the character described, the combination comprising a housing including a generally upstanding base and a bracket arm extending laterally of the base, a first shaft and a second shaft carried by the bracket arm and projecting therebelow, said shafts being substantially vertical and parallel, said first shaft including a universal coupling intermediate its ends, a wheel secured to the lower part of each shaft, at least the peripheral portion of each wheel being electrically conductive, a rotary stub shaft carried by the housing, a bracket connected to the first shaft intermediate its wheel and the universal coupling and connected to and rotatable with the stub shaft, a lever connected to the stub shaft for imparting rotation to the bracket, spring-pressed means for normally urging the lever and bracket in one direction of rotation about the axis of the stub shaft, a stop carried by the housing for limiting rotational movement of the lever and bracket in said one direction, means operable from the exterior of the housing for imparting rotation to the lever and bracket in a reverse direction against the action of the spring-pressed means, and a stop within the housing for limiting rotational movement of the lever and bracket in said reverse direction.

BENJAMIN W. MERZ.
ALBERT M. SCHWEDA.

REFERENCES CITED

The following references are of record in the file of this patent:

UNITED STATES PATENTS

| Number | Name | Date |
|---|---|---|
| 1,234,365 | Makowski | July 24, 1917 |
| 1,248,927 | Schkommodau | Dec. 4, 1917 |
| 1,787,115 | Lewis | Dec. 30, 1930 |
| 2,324,068 | Crandell | July 13, 1943 |
| 2,390,572 | Bradander | Dec. 11, 1945 |

Certificate of Correction

Patent No. 2,434,330. January 13, 1948.

BENJAMIN W. MERZ ET AL.

It is hereby certified that error appears in the above numbered patent requiring correction as follows: In the heading to the printed specification, line 1, for the patent number "2,430,330" read *2,434,330*; and that the said Letters Patent should be read with this correction therein that the same may conform to the record of the case in the Patent Office.

Signed and sealed this 4th day of May, A. D. 1948.

[SEAL]

THOMAS F. MURPHY,
*Assistant Commissioner of Patents.*